US009429186B2

(12) United States Patent
Forthaus et al.

(10) Patent No.: US 9,429,186 B2
(45) Date of Patent: Aug. 30, 2016

(54) JOINT HOUSING OF A BALL JOINT AS WELL AS METHOD FOR MOUNTING THE JOINT HOUSING ON A CARRIER ELEMENT

(75) Inventors: Uwe Forthaus, Duesseldorf (DE); Lothar Schaumann, Ratingen (DE); Harald Walter, Duisburg (DE)

(73) Assignee: THK RHYTHM AUTOMOTIVE GmbH, Deuesseldorf (DE)

( * ) Notice: Subject to any disclaimer, the term of this patent is extended or adjusted under 35 U.S.C. 154(b) by 31 days.

(21) Appl. No.: 14/235,135

(22) PCT Filed: Jul. 12, 2012

(86) PCT No.: PCT/EP2012/002942
§ 371 (c)(1),
(2), (4) Date: Apr. 7, 2014

(87) PCT Pub. No.: WO2013/013779
PCT Pub. Date: Jan. 31, 2013

(65) Prior Publication Data
US 2014/0212205 A1 Jul. 31, 2014

(30) Foreign Application Priority Data
Jul. 28, 2011 (DE) .......................... 10 2011 108 881

(51) Int. Cl.
*F16C 11/06* (2006.01)

(52) U.S. Cl.
CPC ............ *F16C 11/0666* (2013.01); *F16C 11/06* (2013.01); *F16C 11/069* (2013.01);
(Continued)

(58) Field of Classification Search
CPC ............ F16C 11/0666; F16C 11/0628; F16C 11/0671; F16C 11/0685; F16C 11/0695; F16C 11/0614; F16C 11/0619; F16C 11/0623; F16C 11/103; F16C 11/106; F16C 11/06–11/086; Y10T 29/49863; Y10T 29/49872; Y10T 403/32631; Y10T 29/49918; Y10T 29/49853; Y10T 403/32721; Y10T 403/32729; Y10T 403/32737; Y10T 403/32786; Y10T 403/32795; Y10T 403/32803; F16J 1/22; B60G 7/005; B60G 2204/416; B62D 7/16; B23P 2700/11
See application file for complete search history.

(56) References Cited

U.S. PATENT DOCUMENTS 1,909,430 A     5/1933  Skillman
2,556,767 A  *  6/1951  McCann ................... B60F 3/20
                                                   280/124.139

(Continued)

FOREIGN PATENT DOCUMENTS

DE     9206847 U1      7/1992
DE    19803056 A1  *   7/1999  ............. B29C 57/12
(Continued)

OTHER PUBLICATIONS

International Search Report for PCT/EP2012/002942 dated Oct. 17, 2012.
(Continued)

*Primary Examiner* — Christopher Besler
*Assistant Examiner* — Jun Yoo
(74) *Attorney, Agent, or Firm* — Westerman, Hattori, Daniels & Adrian, LLP

(57) ABSTRACT

A joint housing of a ball joint comprises a sheet-metal part for accommodating a ball head, which is substantially rotationally symmetrical with respect to a joint axis and includes a circumferential wall portion, wherein the circumferential wall portion includes a housing opening at an axial end, through which a joint pin can extend, wherein the sheet-metal part is formed with two layers at this axial end of the circumferential wall portion.

5 Claims, 11 Drawing Sheets

(52) U.S. Cl.
CPC ........ *F16C11/0628* (2013.01); *F16C 11/0671* (2013.01); *F16C 11/0685* (2013.01); *F16C 11/0695* (2013.01); *Y10T 29/49853* (2015.01); *Y10T 29/49863* (2015.01); *Y10T 29/49872* (2015.01); *Y10T 29/49918* (2015.01); *Y10T 403/32631* (2015.01)

(56) References Cited

U.S. PATENT DOCUMENTS 2,852,288 A 9/1958 Booth
5,061,110 A 10/1991 Wood, Jr.

FOREIGN PATENT DOCUMENTS

| DE | 0999372 A1 * | 5/2000 | .......... F16C 11/0638 |
|----|--------------|--------|-------------------------|
| EP | 1760337 A2 | 3/2007 | |
| GB | 1547052 A | 6/1979 | |
| JP | 08128438 A | 5/1996 | |
| JP | 1037944 A | 2/1998 | |
| JP | 20000154821 A | 6/2000 | |

OTHER PUBLICATIONS

Chinese 1st Office Action, Application No. 201280043045.6 dated Jul. 3, 2015.

* cited by examiner

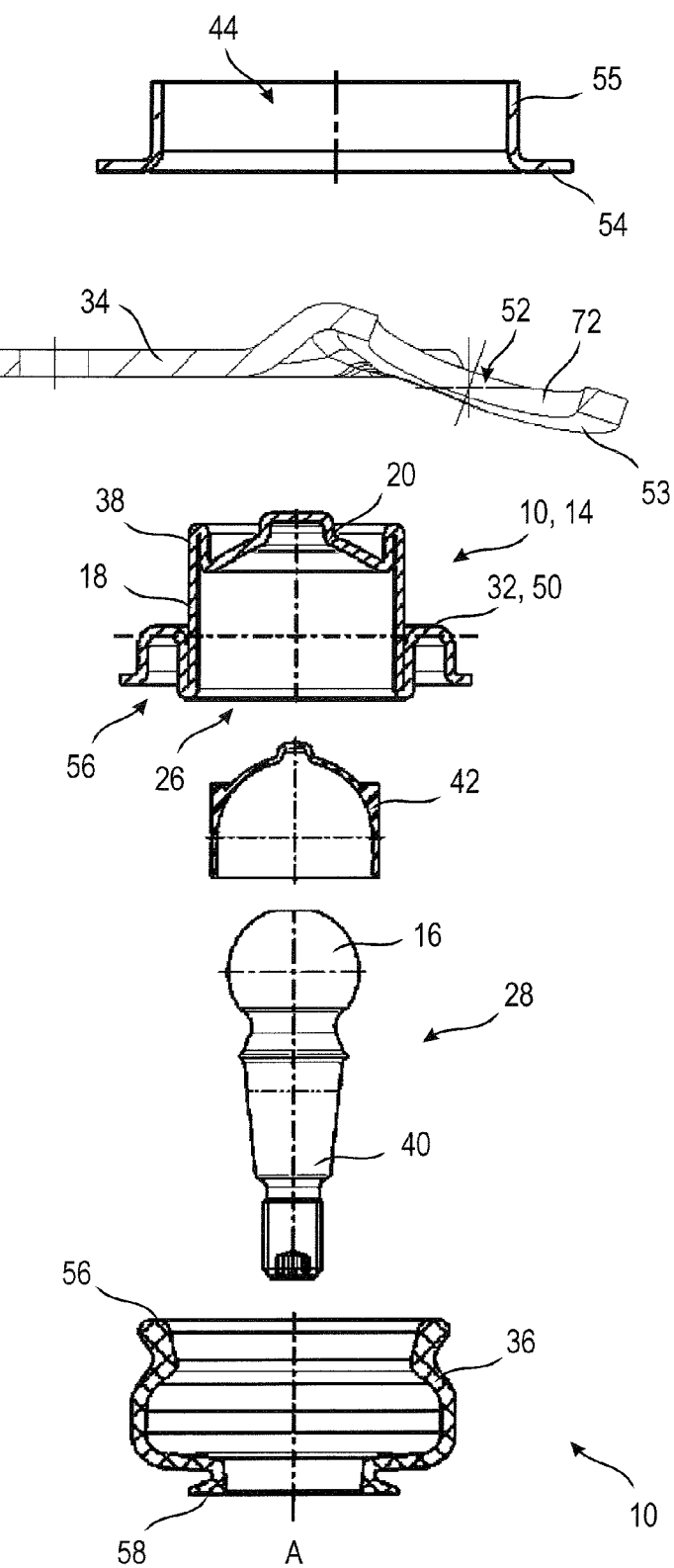

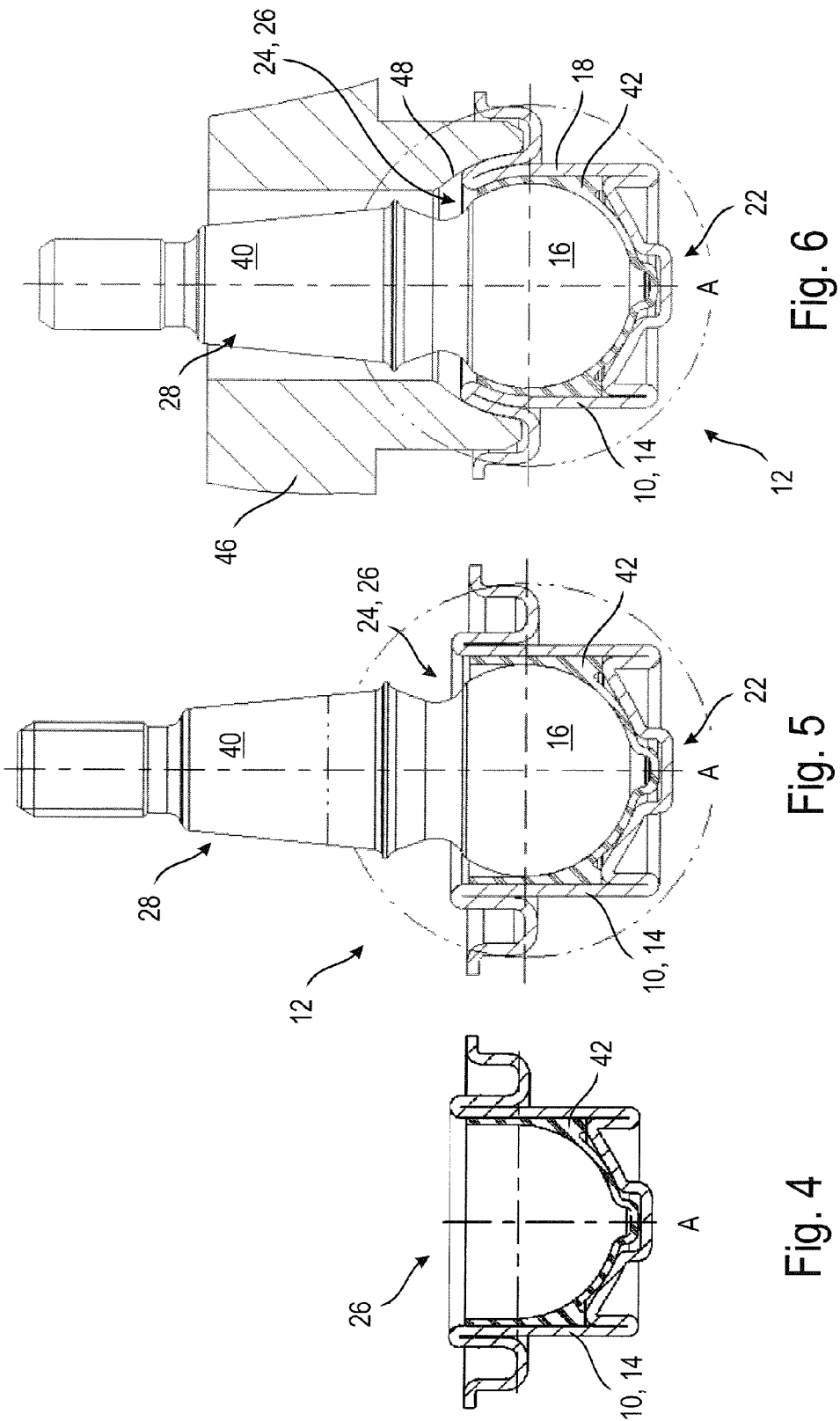

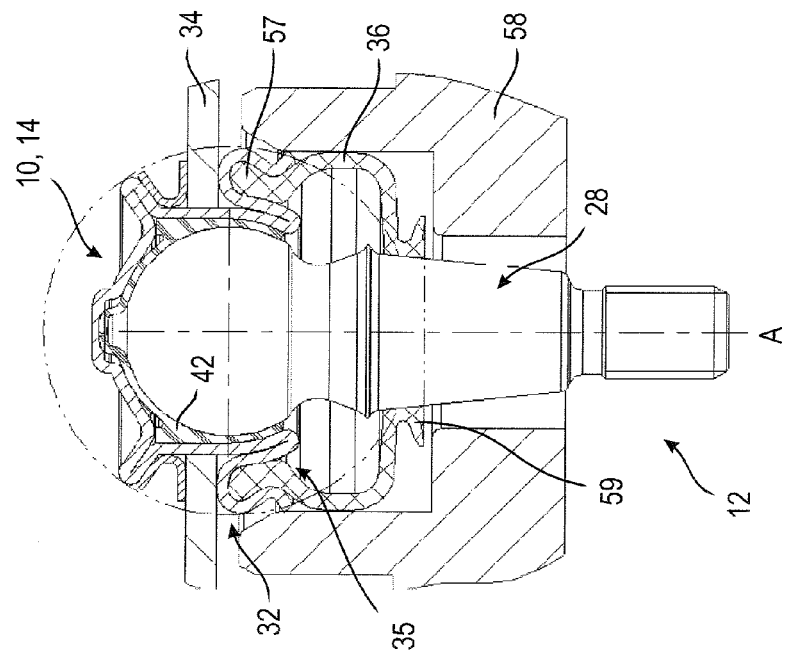
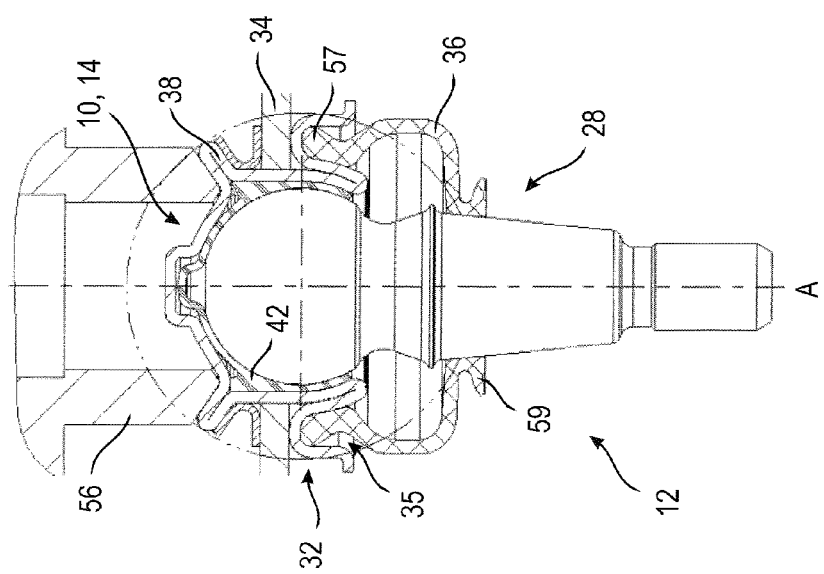
Fig. 9
Fig. 10

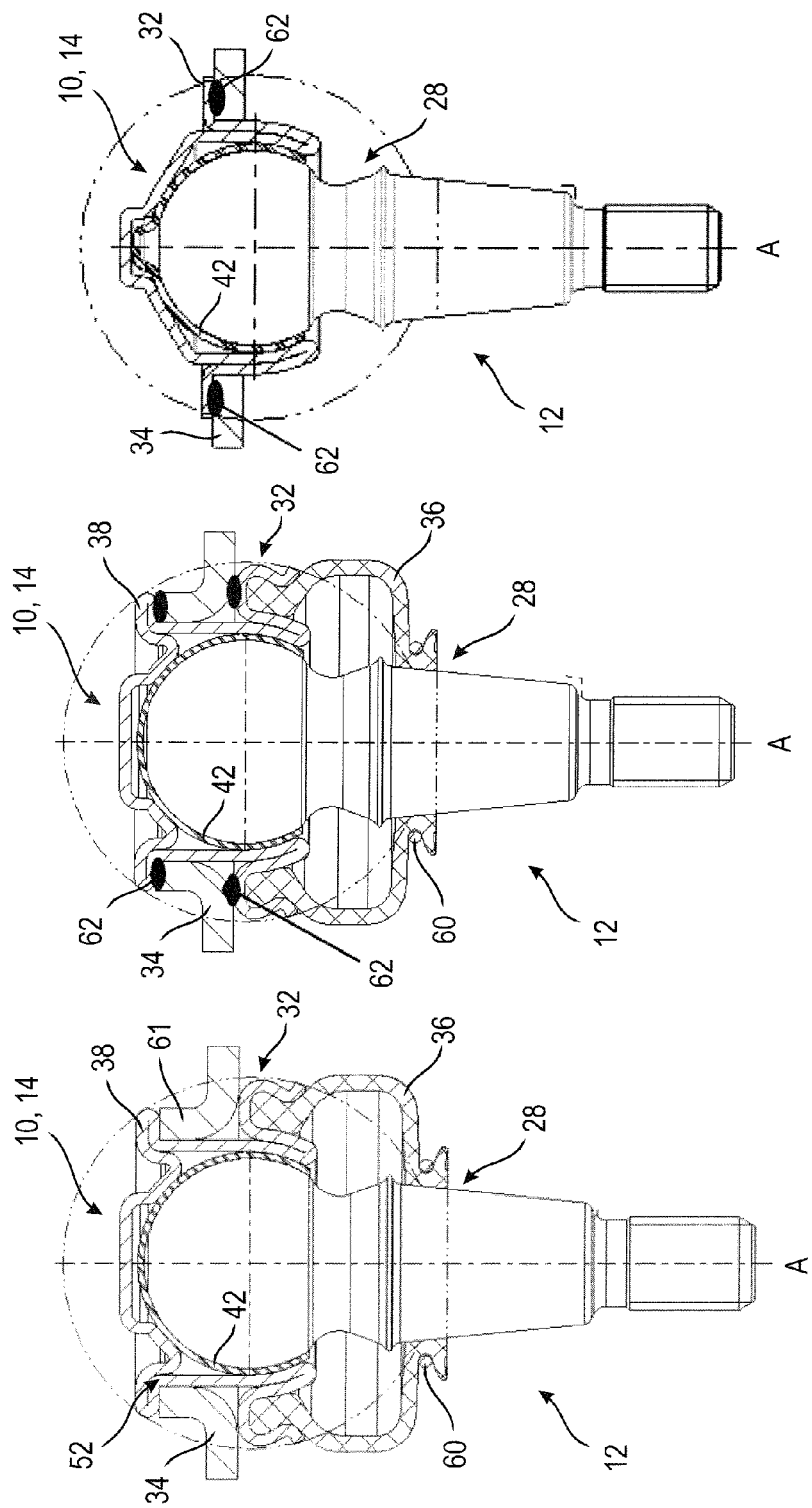

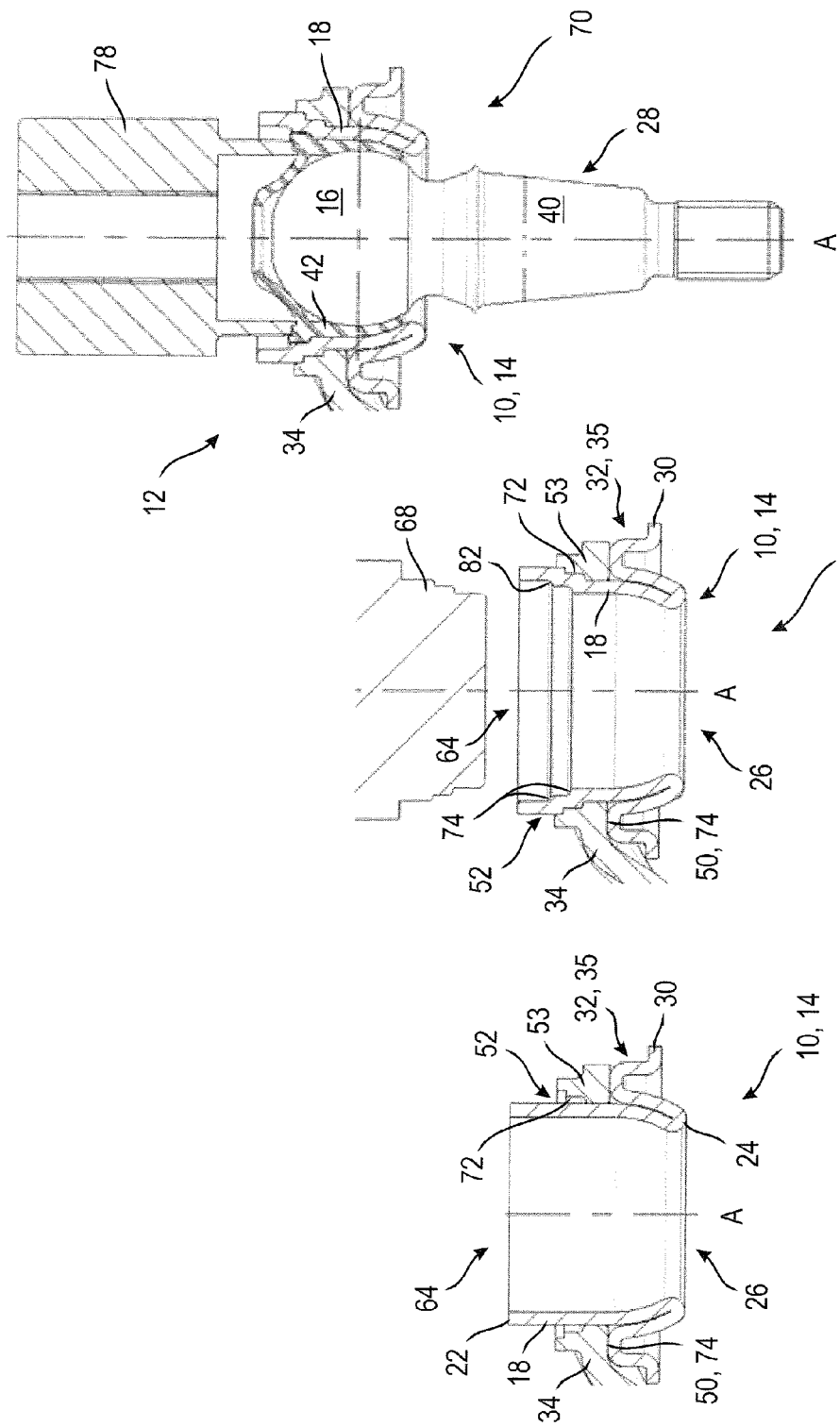

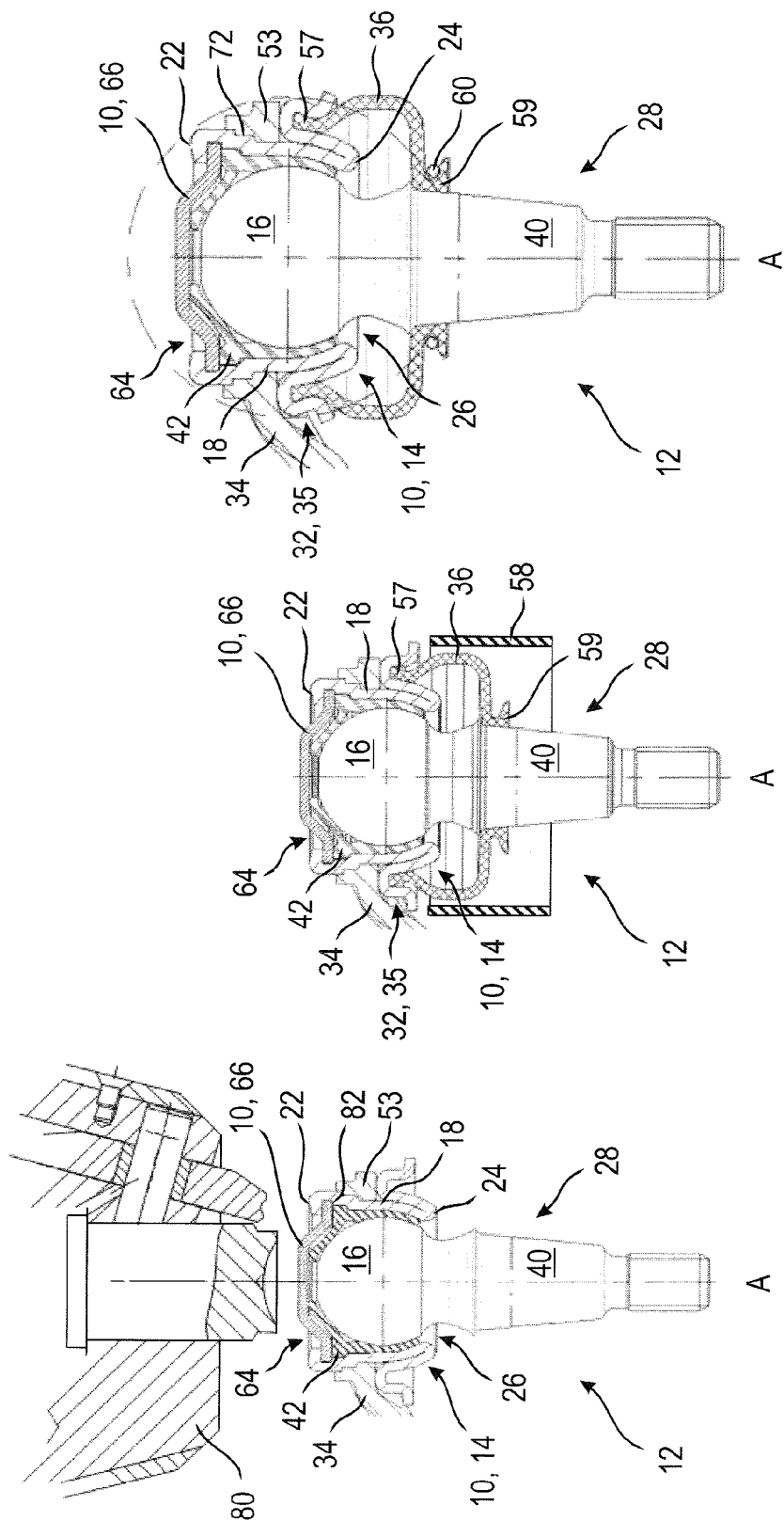

JOINT HOUSING OF A BALL JOINT AS WELL AS METHOD FOR MOUNTING THE JOINT HOUSING ON A CARRIER ELEMENT

CROSS-REFERENCE TO RELATED APPLICATIONS

This application is a national stage of International Application No. PCT/EP2012/002942 filed Jul. 12, 2012, the disclosures of which are incorporated herein by reference in entirety, and which claimed priority to German Patent Application No. DE 10 2011 108 881.8 filed Jul. 28, 2011, the disclosures of which are incorporated herein by reference in entirety.

BACKGROUND OF THE INVENTION

This invention relates to a joint housing of a ball joint, with a sheet-metal part for accommodating a ball head, which is substantially rotationally symmetrical with respect to a joint axis and includes a circumferential wall portion, wherein the circumferential wall portion includes a housing opening at an axial end, through which a joint pin can extend. In addition, this invention also relates to a method for mounting such joint housing on a carrier element.

Joint housings for ball joints formed of sheet metal already are generally known from the prior art, in order to reduce the manufacturing effort for the ball joints.

The generic U.S. Pat. No. 3,284,115 A for example discloses a joint housing which is composed of a pot-shaped, first sheet-metal part and a ring-shaped, second sheet-metal part.

BRIEF SUMMARY OF THE INVENTION

It is a feature of the invention to create a joint housing for ball joints, which with a further reduced manufacturing effort ensures a high joint stability and long service life.

According to the invention, this feature is solved by a joint housing as mentioned above, in which the sheet-metal part is formed with two layers at the axial end of the circumferential wall portion. Formed with two layers here means that in this region the wall of the joint housing consists of two sheet-metal layers resting flat against each other. As a result of the double-layer formation of the circumferential wall portion in the region of the axial end of the housing opening, through which later on a joint pin of the ball joint can extend, an extremely stable joint housing is obtained with little effort.

Preferably, the sheet-metal part has a radial tab at a free edge of the double-layer portion. In terms of manufacture, this radial tab of the sheet-metal part can be realized with little effort and contributes to an easy assembly of the joint housing on a carrier element and/or of a sealing bellows at the joint housing.

As seen in an axial longitudinal section, the radial tab in particular can be formed as U-shaped receptacle for a sealing bellows. In this way, the sealing bellows can be fixed at the joint housing with minimum effort. For this purpose, an edge of the sealing bellows is introduced into the U-shaped receptacle and clamped to the joint housing by deformation of the receptacle.

In one embodiment, the sheet-metal part is formed with one layer at a first axial end of the circumferential wall portion and includes an insertion opening through which the joint pin can be introduced. At a second axial end of the circumferential wall portion the sheet-metal part is formed with two layers and includes the housing opening, wherein a housing cover is provided for closing the insertion opening. During assembly of the joint housing on a carrier element, this housing construction with a sheet-metal part which is open at both axial ends provides for a particularly firm and easily producible connection between the two components.

In another embodiment of the joint housing, the sheet-metal part for accommodating the ball head is formed pot-shaped and includes the circumferential wall portion as well as a bottom portion, wherein the circumferential wall portion is closed by the bottom portion at a first axial end and at an opposite second axial end includes the housing opening. In this construction the joint housing can be designed as one-piece sheet-metal part which after receiving the ball head can be "closed" by simple plastic deformation such that the ball head is pivotally held in the joint housing. As a result of the double-layer formation of the sheet-metal part in the region of the deformed portion, the joint housing has a sufficient stability also with a high load on the joint.

In this embodiment of the joint housing, the pot-shaped sheet-metal part can be designed with two layers in the transition region between the circumferential wall portion and the bottom portion and form a circumferential sheet-metal fold. This sheet-metal fold can be integrally molded to the pot-shaped sheet-metal part with little effort and just like the double-layer sheet at the second axial end of the circumferential wall portion contributes to an increased stability of the joint housing.

Preferably, the sheet-metal fold extends in axial direction away from the second axial end of the circumferential wall portion and is deformable from outside the joint housing. By means of the circumferential sheet-metal fold, a joint pretension thus can be applied in a simple way and/or the assembly of the joint housing on a carrier element can further be simplified.

Moreover, the invention also comprises a ball joint with a joint housing as described above, a joint pin which comprises a ball head accommodated in the joint housing as well as a shank, and with a sealing bellows which has a first axial edge attached to the joint housing and a second axial edge attached to the shank, wherein the first axial edge of the sealing bellows extends into a U-shaped receptacle integrally molded to the joint housing, and wherein the first axial edge is positively and/or frictionally fixed in the U-shaped receptacle. The sealing bellows thus can be mounted on the joint housing in a particularly simple way without separate mounting elements such as clamping or locking rings.

In an alternative embodiment, the ball joint comprises an above-described joint housing, a joint pin which includes a ball head accommodated in the joint housing as well as a shank, and a sealing bellows which has a first axial edge attached to the joint housing and a second axial edge attached to the shank, wherein a free edge of the double-layer portion of the sheet-metal part adjoins the sealing bellows and forms an axial stop for the first axial edge thereof. The stop for axially fixing the sealing bellows in this case is obtained "automatically" during the manufacture of the joint housing, concretely during shaping of the sheet-metal part for forming the double-layer portion. Thus, the usual expenditure for manufacturing special grooves or shoulders in the joint housing, in order to form the desired stop, can be omitted.

Furthermore, the invention also relates to an assembly with an above-described joint housing as well as a carrier element which includes an assembly opening surrounded by a holding portion, wherein the circumferential wall portion of the joint housing extends through the assembly opening, and wherein the holding portion surrounds the circumferential wall portion of the joint housing with such a pretension that the joint housing is frictionally fixed in the holding portion. The advantage of such a frictional connection between the joint housing and the carrier element as compared to conventional screwed or welded connections consists in a considerably reduced manufacturing effort.

The sheet-metal part can be provided with supporting surfaces which rest against the holding portion in axial direction, in particular in the form of step-like expansions at a first axial end of the circumferential wall portion and/or a double-layer wall portion at a second axial end of the circumferential wall portion.

The invention finally also comprises a method for mounting a joint housing on a carrier element with the following steps:
providing an above-described joint housing;
providing a carrier element with an assembly opening;
axially introducing the sheet-metal part of the joint housing into the assembly opening, until its circumferential wall portion adjoins an edge of the assembly opening; and
plastically deforming the sheet-metal part such that it is positively and/or non-positively fixed at the carrier element.

This method offers the advantage that due to the positive and/or non-positive connection the mounting effort is distinctly reduced as compared to conventional screwed or welded connections, without negatively influencing the stability or durability of the connection.

In one method variant, a forming tool engages into the sheet-metal part and radially expands the circumferential wall portion by plastic deformation such that between the circumferential wall portion and the edge of the assembly opening a non-positive connection is obtained. Since mounting the joint housing on the carrier element takes place before manufacturing the ball joint, the tool can easily be introduced into the joint housing and plastically deform the circumferential wall portion of the sheet-metal part with little effort.

Particularly preferably, the assembly opening of the carrier element also is radially expanded by the forming tool. Due to the plastic expansion of the circumferential wall portion, an existing gap to the edge of the assembly opening initially is closed. To obtain a continuously gap-free and hence particularly firm and durable non-positive connection, it was found to be advantageous when the sheet-metal part is deformed even further after closing the gap, so that the assembly opening of the carrier element also is radially expanded by plastic deformation. As tool, a sizing stamp usually is employed, which expands the circumferential wall portion of the sheet-metal part exactly to a desired diameter.

The sheet-metal part can have a radial tab at a free edge of the double-layer portion, wherein the joint housing is inserted into the assembly opening of the carrier element, until the radial tab supports on an edge of the assembly opening. This facilitates the axial positioning of the joint housing relative to the carrier element. In addition, the axial stop prevents an axial relative movement between the joint housing and the carrier element and thus supports the non-positive connection of the components, which is present in axial direction.

In a further method variant, the edge of the assembly opening is formed such that a diameter of the assembly opening is reduced in axial direction towards the double-layer portion of the circumferential wall portion, in particular is reduced incrementally, wherein a forming tool adapted to the edge contour of the assembly opening engages into the sheet-metal part and in the region of the assembly opening positively deforms the circumferential wall portion of the sheet-metal part to the edge contour of the assembly opening. The non-positive connection present in axial direction between the joint housing and the carrier element thereby can be supported in a simple way by an additional positive connection.

Other advantages of this invention will become apparent to those skilled in the art from the following detailed description of the preferred embodiments, when read in light of the accompanying drawings.

BRIEF DESCRIPTION OF THE DRAWINGS

FIG. 3 shows an exploded view of a ball joint with a joint housing according to FIG. 2;

FIGS. 4 to 10 show individual method steps for the manufacture and assembly of a ball joint of the invention by using the joint housing according to FIG. 2;

FIGS. 11 to 16 show further embodiments of ball joints of the invention with joint housings according to FIG. 1 or 2;

FIGS. 19 to 24 show individual method steps of a method of the invention for mounting a joint housing on a carrier element by using the joint housing of the invention according to FIG. 18.

DETAILED DESCRIPTION OF THE DRAWINGS

Figure 1:
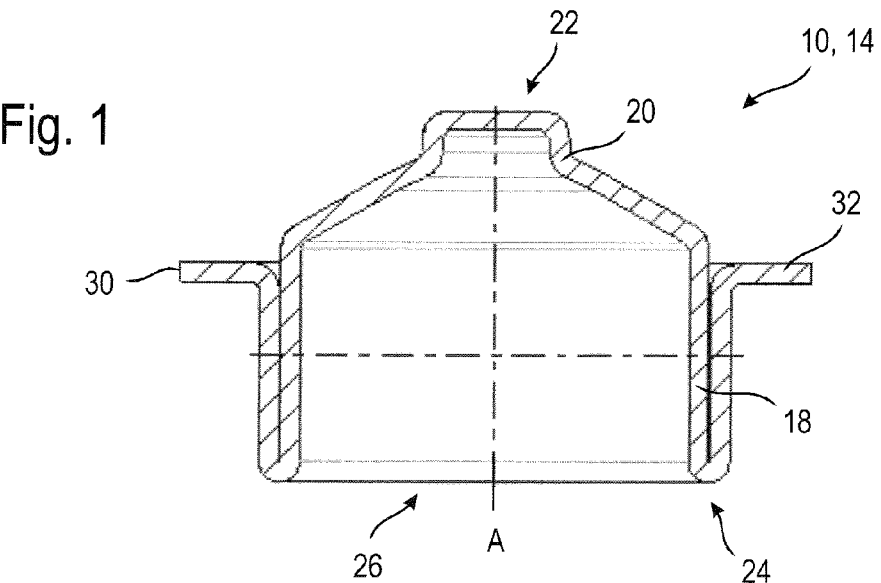
FIG. 1 shows a longitudinal section through a joint housing of the invention according to a first embodiment.

FIG. 1 shows a joint housing 10 of a ball joint 12 according to a first embodiment, with a sheet-metal part 14 for accommodating a ball head 16, which is substantially rotationally symmetrical with respect to a joint axis A and includes a circularly cylindrical circumferential wall portion 18. At an axial end 24, the circumferential wall portion 18 includes a housing opening 26 through which a joint pin 28 can extend. At the edge of the housing opening 26, i.e. at the axial end 24 of the circumferential wall portion 18, the sheet-metal part 14 is formed with two layers, in order to achieve a greater housing stability in the region of the housing opening 26.

In the first embodiment according to FIG. 1, the sheet-metal part 14 for accommodating the ball head 16 is formed pot-shaped and includes the circumferential wall portion 18 as well as a bottom portion 20, wherein the circumferential wall portion 18 is closed by the bottom portion 20 at a first axial end 22 and at an opposite second axial end 24 includes the housing opening 26.

In addition, the sheet-metal part 14 has a radial tab 32 for the positive and/or cohesive connection with a carrier element 34 at a free edge 30 of the double-layer portion (see also FIGS. 10 to 16).

The one-piece joint housing 10 formed as pot-shaped sheet-metal part 14 with at least one double-layer portion preferably is made of steel sheet or organic sheet.

Figure 2:
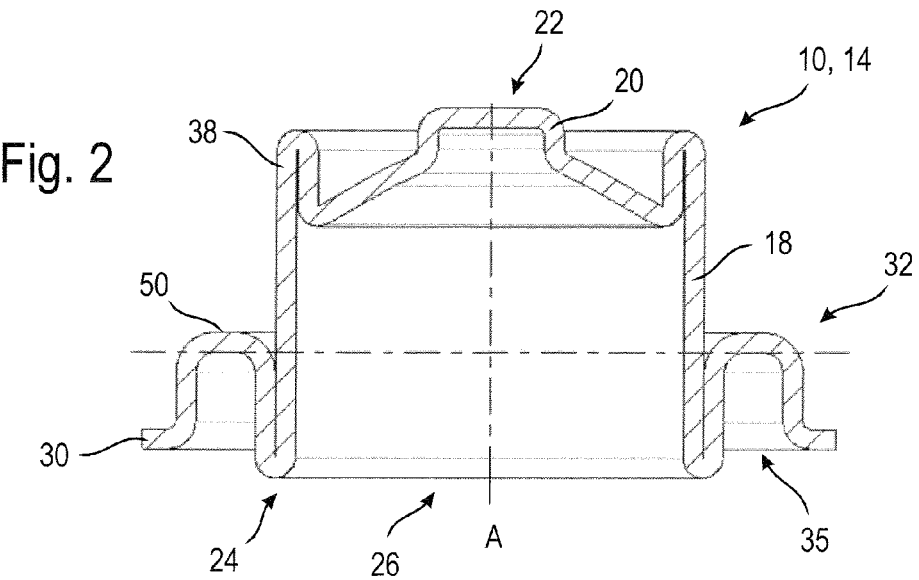
FIG. 2 shows a longitudinal section through a joint housing of the invention according to a second embodiment.

Just like FIG. 1, FIG. 2 also shows a longitudinal section through the joint housing 10 of a ball joint 12, however according to a second embodiment. corresponding features of the two joint housings 10 are provided with identical reference numerals. With respect to the common features, reference is made explicitly to the above description of FIG. 1 and in the following merely the differences and resulting advantages of the joint housing 10 according to FIG. 2 will be discussed.

In contrast to the embodiment according to FIG. 1, for example, the radial tab 32 of the joint housing 10 according to FIG. 2 is formed as U-shaped receptacle 35 for a sealing bellows 36 as seen in an axial longitudinal section (see also FIGS. 9 to 16). The sealing bellows 36 thereby can easily be fixed at the joint housing 10, and additional, separate fixing elements such as clamping or locking rings can be omitted.

In addition, the joint housing 10 according to FIG. 2 is characterized in that in a transition region between the circumferential wall portion 18 and the bottom portion 20 the pot-shaped sheet-metal part 14 is designed with two layers and forms a circumferential sheet-metal fold 38.

Figure 8:
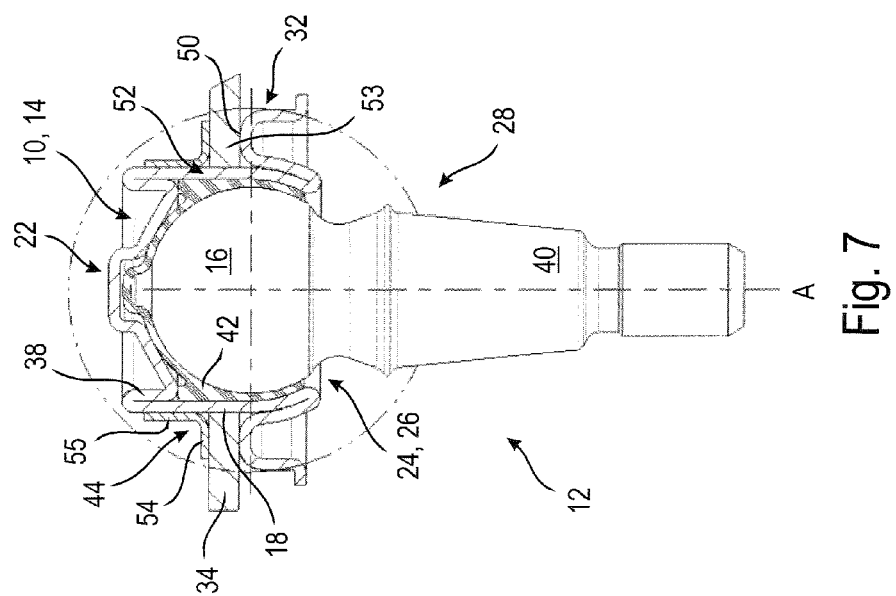

According to FIG. 2, the sheet-metal fold 38 extends in axial direction away from the second axial end 24 of the circumferential wall portion 18 and is deformable from outside the joint housing 10 (cf. FIG. 8).

The double-layer sheet in the region of the circumferential sheet-metal fold 38 just like the double-layer sheet at the second axial end 24 of the circumferential wall portion 18 contributes to a high stability of the joint housing 10 and hence in the final analysis also to the desired durability of the ball joint 12. In addition, the circumferential sheet-metal fold 38 also is advantageous because during its deformation a desired joint pretension can be applied with little effort and/or the joint housing 10 can be mounted on the carrier element 34 by means of a positive connection.

FIG. 3 shows the carrier element 34 and the ball joint 12 with the joint housing 10 according to FIG. 2 in an exploded view, in which the various individual components are clearly shown.

Apart from the carrier element 34 and the joint housing 10 the ball joint 12 according to FIG. 3 comprises the joint pin 28 with the ball head 16 and a shank 40, the sealing bellows 36 for the protection of the ball joint 12, a bearing shell 42 for accommodating the ball head 16 as well as a support ring 44 for fixing the ball joint 12 at the carrier element 34.

With reference to FIGS. 4 to 10 a method for manufacturing and mounting the ball joint 12 is shown, wherein FIGS. 4 to 6 show method steps for manufacturing the ball joint 12 and FIGS. 7 to 10 show method steps for mounting the ball joint 12 on the carrier element 34.

At the beginning of the method the joint housing 10 is provided, which preferably is made of steel sheet or organic sheet and for example is formed to a pot-shaped sheet-metal part 14 according to FIG. 2.

In a succeeding method step, the bearing shell 42 preferably prefabricated of plastic material is axially inserted into the pot-shaped sheet-metal part 14, so that an assembly according to FIG. 4 is obtained.

Subsequently, the ball head 16 of the joint pin 28 is axially introduced into the joint housing 10 and the bearing shell 42, wherein the assembly depicted in FIG. 5 is obtained.

In a further method step according to FIG. 6, the joint housing 10, concretely the double-layer portion of the pot-shaped sheet-metal part 14 adjacent to the housing opening 26, is plastically deformed such that the joint pin 28 is axially held relative to the joint housing 10. A ring-shaped forming tool 46 engages the second axial end 24 of the circumferential wall portion 18 and deforms the joint housing 10 such that a diameter of the housing opening 26 is reduced. In the present case, a contact surface 48 of the forming tool 46 is tapered in direction from the first axial end 22 towards the second axial end 24, whereby the forming tool 46 must merely be pressed onto the joint housing 10 axially in direction from the second axial end 24 to the first axial end 22, in order to "close" the joint housing 10 in the desired way.

With the exception of the assembly of the sealing bellows 36, the actual manufacture of the ball joint 12 already is largely completed after this method step, since the joint pin 28, adjacent to the bearing shell 42, is pivotally held in the joint housing 10.

FIGS. 7 to 10 now show the assembly of the ball joint 12 on the carrier element 34, wherein this assembly can directly follow the manufacture of the ball joint 12.

Proceeding from FIG. 6, the joint housing 10 includes the U-shaped radial tab 32 which comprises an axial bearing surface 50 for the carrier element 34 directed towards the first axial end 22. For the assembly of the ball joint 12, the joint housing 10 is axially inserted into an assembly opening 52 of the carrier element 34, until the radial tab 32 supports on an edge 53 of the assembly opening 52 with its bearing surface 50. The radial tab 32 thus forms an axial abutment for the carrier element 34 and accordingly simplifies the assembly of the ball joint 12 on the carrier element 34.

Figure 7:
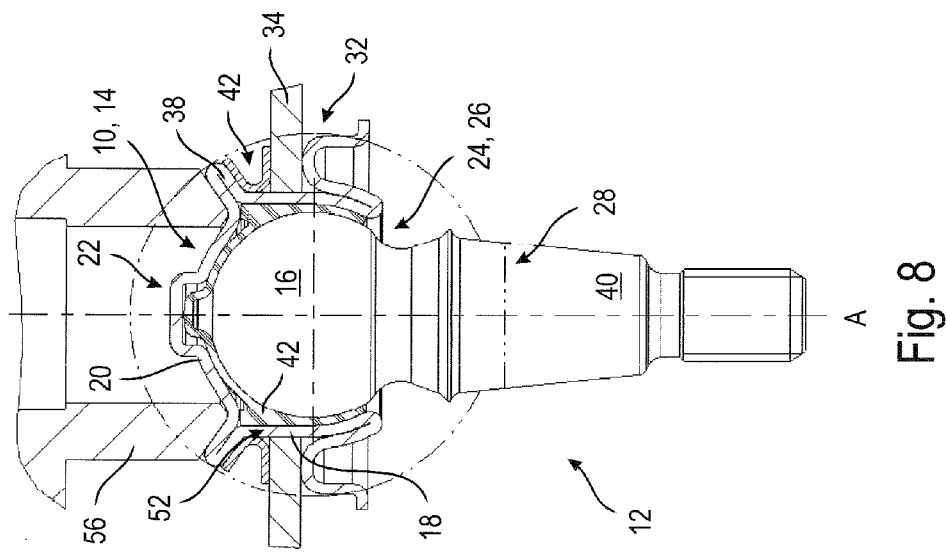

Subsequently, the support ring 44 L-shaped in cross-section is put onto the joint housing 10 from the first axial end 22 such that a leg 54 of the L-shaped cross-section rests against the edge 53 of the assembly opening 52 and a further leg 55 of the L-shaped cross-section adjoins the outside of the circumferential wall portion 18, preferably accurately rests against the same (cf. FIG. 7). The leg 55 extends in axial direction from the single-layer circumferential wall portion 18 of the pot-shaped sheet-metal part 14 up to the circumferential sheet-metal fold 38.

In a succeeding method step according to FIG. 8, the circumferential sheet-metal fold 38 as well as the support ring 44 is plastically deformed by means of a further ring-shaped forming tool 56. Due to this deformation, the carrier element 34 is clamped in axial direction between the sheet-metal fold 38 and the radial tab 32 of the joint housing 10 by means of the support ring 44. Preferably a diameter of the assembly opening 52 accurately corresponds to an outside diameter of the circumferential wall portion 18, so that the carrier element 34 also is fixed at the joint housing 10 vertically to the joint axis A. In general, a positive connection hence is obtained, which firmly connects the ball joint 12 with the carrier element 34.

In other words, the carrier element 34 is axially urged against the radial tab 32 of the pot-shaped sheet-metal part 14 due to the plastic deformation of the circumferential sheet-metal fold 38.

During the deformation of the circumferential sheet-metal fold 38, the ball head 16 in addition is axially urged from the bottom portion 20 of the sheet-metal part 14 in direction towards the second end 24 of the circumferential wall portion 18. Since the deformation of the sheet-metal fold 38 is effected only after closing the joint housing 10, i.e. after the deformation at the second axial end 24 of the circumferential wall portion 18 (cf. FIG. 6), the ball head 16 no longer or only slightly is able to move in direction towards the second end 24 of the circumferential wall portion 18. Consequently, the elastic bearing shell 42 is axially pretensioned due to the deformation of the sheet-metal fold 38 and thus a usually desired joint pretension is applied. This joint pretension advantageously prolongs the period in which the ball head 16 is accommodated in the bearing shell 42 and the joint housing 10 largely without clearance.

As mentioned already, the radial tab 32 in the present exemplary embodiment is formed as circumferential, U-shaped receptacle 35, wherein a first axial edge 57 of the sealing bellows 36 is introduced into the receptacle 35 (cf. FIG. 9) and clamped to the joint housing 10 by plastic deformation of the U-shaped receptacle 35 by means of a further forming tool 58 (cf. FIG. 10). In this way, the radial tab 32 not only forms an abutment for the carrier element 34, but also fixes the sealing bellows 36 at the joint housing 10 of the ball joint 12 in a simple and advantageous way.

Finally, a clamping or locking ring 60 according to FIGS. 11 to 15 must merely be mounted at the opposite second axial edge 59 of the sealing bellows 36, in order to also securely fix the sealing bellows 36 at the shank 40 of the joint pin 28.

Thereafter, the ball joint 12 on the one hand is finished and on the other hand already mounted on the carrier element 34 in an advantageous way. This carrier element 34 for example is a transverse arm of a motor vehicle steering system made of steel sheet, aluminum or plastics. Alternatively, the carrier element 34 is a connection component according to FIG. 3, which for example is flange-mounted to a transverse arm.

FIGS. 11 to 16 show further embodiments of ball joints 12 which are mounted on a carrier element 34 and have a joint housing 10 according to FIG. 1 or 2.

Figure 11:
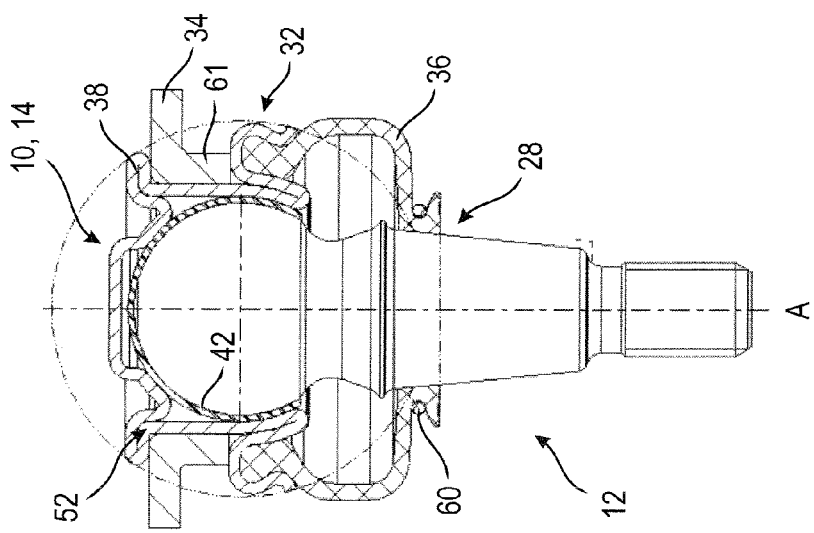

The ball joint 12 according to FIG. 11 differs from the embodiment according to FIG. 10 merely by the used support ring 44. In FIG. 10, the support ring 44 rests on an axial end face of the carrier element 34, whereas in FIG. 11 it is radially inserted or pressed into the assembly opening 52 between the joint housing 10 and the carrier element 34.

Figure 12:
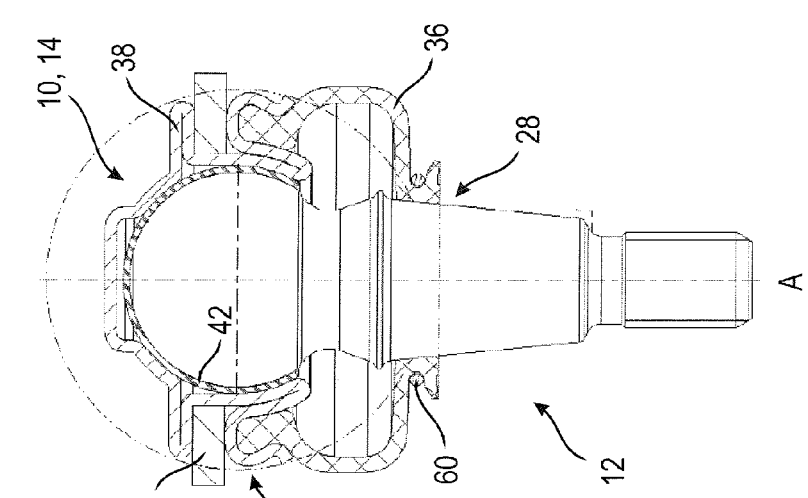

In the embodiment according to FIG. 12 no support ring 44 is provided, so that the circumferential sheet-metal fold 38 of the joint housing 10 directly rests against the carrier element 34.

Figure 13:
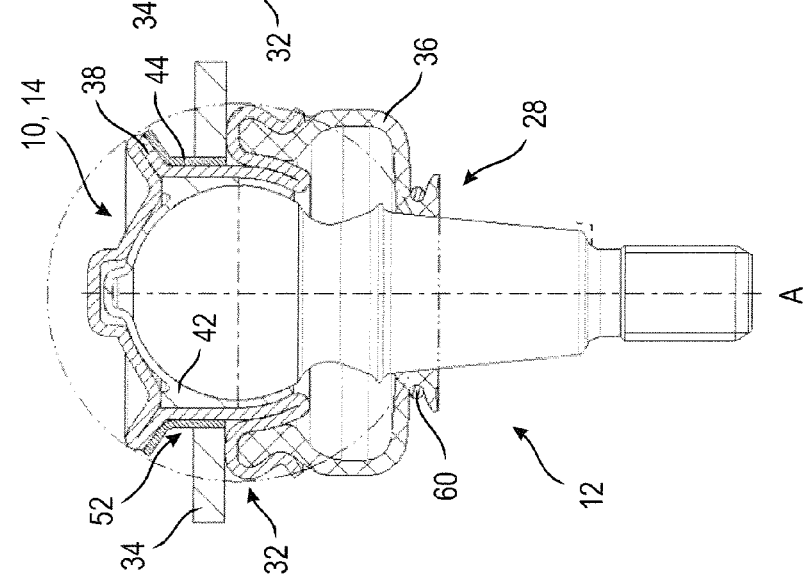

In the ball joints 12 according to FIGS. 13 and 14, the carrier element 34 has a collar 61, i.e. an axially deformed edge portion, in the region of its assembly opening 52, in order to increase the radial contact region between the joint housing 10 and the carrier element 34.

The embodiments of the ball joints 12 according to FIGS. 15 and 16 clearly show that the positive connection between the carrier element 34 and the joint housing 10 also can be combined with a cohesive connection 62, for example a welded or adhesive connection. This applies both for joint housings 10 according to FIG. 2 (cf. FIG. 15) and for housing designs according to FIG. 1 (cf. FIG. 16).

Just like FIGS. 1 and 2, FIGS. 17 and 18 also each show a longitudinal section through the joint housing 10 of a ball joint 12, however according to a third and fourth embodiment, respectively. Corresponding features of the respective joint housings 10 are provided with identical reference numerals. With respect to the common features, reference is made explicitly to the above description of FIGS. 1 to 3 and in the following merely the differences and resulting advantages of the joint housings 10 according to FIGS. 17 and 18 will be discussed.

Figure 17:
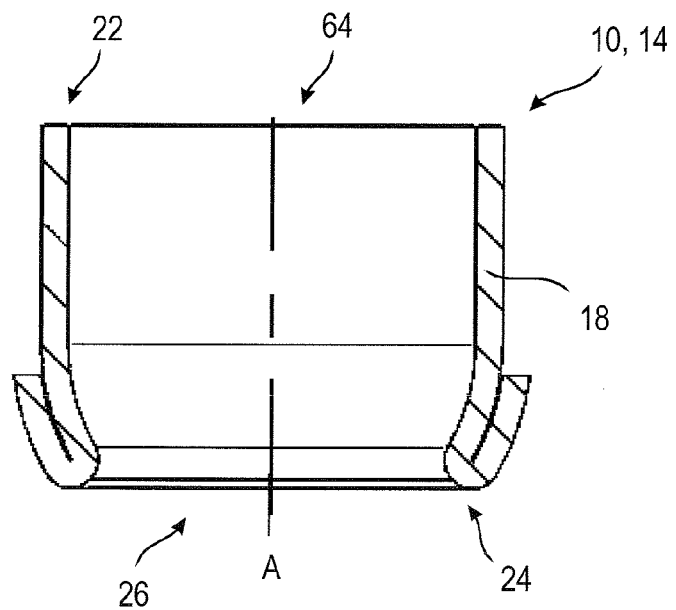
FIG. 17 shows a longitudinal section through a joint housing of the invention according to a third embodiment.
Figure 18:
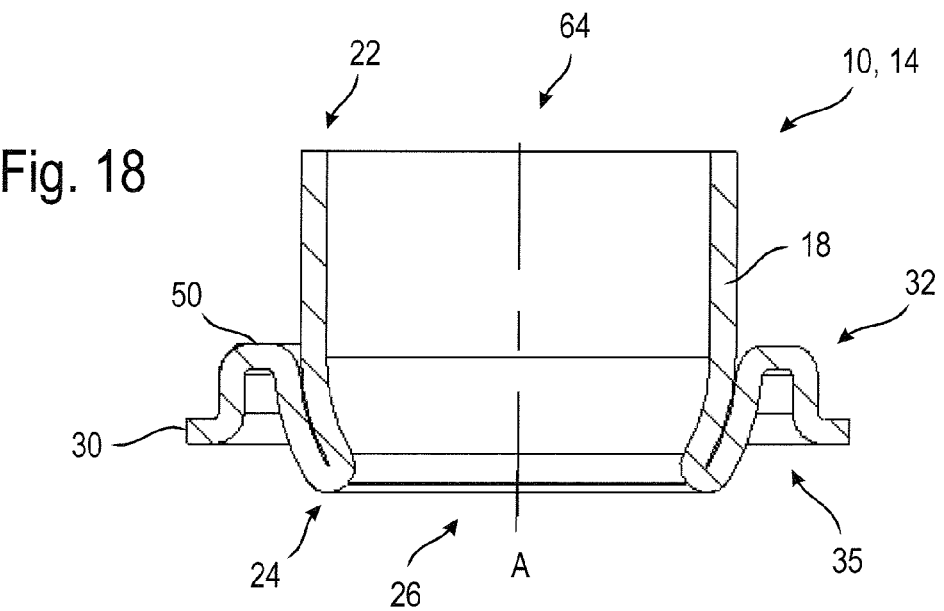
FIG. 18 shows a longitudinal section through a joint housing of the invention according to a fourth embodiment.

FIGS. 17 and 18 each show a joint housing 10 of a ball joint 12, with a sheet-metal part 14 for accommodating a ball head 16, which is substantially rotationally symmetrical with respect to a joint axis A, wherein the sheet-metal part 14 comprises a circularly cylindrical circumferential wall portion 18. At an axial end 24, the circumferential wall portion 18 includes a housing opening 26 through which a joint pin 28 can extend. At the edge of the housing opening 26, i.e. at the axial end 24 of the circumferential wall portion 18, the sheet-metal part 14 is formed with two layers, in order to achieve a greater housing stability in the region of the housing opening 26.

The sheet-metal parts 14 according to FIGS. 17 and 18 are formed with one layer at a first axial end 22 of the circumferential wall portion 18 and in contrast to the embodiments of FIGS. 1 and 2 have an insertion opening 64 through which the joint pin 28 can be introduced. At a second axial end 24 of the circumferential wall portion 18, the sheet-metal part 14 is formed with two layers and includes the housing opening 26. In the third and fourth embodiment, the joint housing 10 additionally comprises a housing cover 66 for closing the insertion opening 64 (cf. FIGS. 22 to 25). Since the ball head 16 can be introduced into the joint housing 10 through the insertion opening 64, the double-layer portion of the sheet-metal part 14 adjacent to the housing opening 26 already is plastically deformed in advance, i.e. before mounting the joint housing 10 on the carrier element 34 and before manufacturing the ball joint 12, such that later on the joint pin 28 is axially held relative to the joint housing 10. In the first and second embodiment of the joint housing 10, this deformation will only be made during the manufacture of the ball joint 12 (cf. FIG. 6).

Analogous to FIG. 2, the sheet-metal part 14 according to FIG. 18 has the radial tab 32 at the free edge 30 of the double-layer portion, which as seen in an axial longitudinal section is formed as U-shaped receptacle 35 for the sealing bellows 36 (see also FIGS. 23 and 24). The sealing bellows 36 thereby can easily be fixed at the joint housing 10, and additional, separate fixing elements such as clamping or locking rings can be omitted.

With reference to FIGS. 19 to 24, a method for mounting the joint housing 10 on a carrier element 34 and for manufacturing the ball joint 12 is shown, wherein FIGS. 19 and 20 show the assembly of the joint housing 10 and FIGS. 21 to 24 show the subsequent manufacture of the ball joint 12.

At the beginning of the method, the carrier element 34 and the joint housing 10 are provided, which joint housing preferably is made of steel sheet or organic sheet and for example is formed to a sheet-metal part 14 according to FIG. 18.

Subsequently, the sheet-metal part 14 of the joint housing 10 is axially introduced into the assembly opening 52, until the circumferential wall portion 18 of the sheet-metal part 14 radially adjoins the edge 53 of the assembly opening 52. According to FIG. 19, the sheet-metal part 14 has the radial tab 32 at the free edge 30 of the double-layer portion, wherein the joint housing 10 is inserted into the assembly opening 52 of the carrier element 34, until the radial tab 32 supports on the edge 53 of the assembly opening. This facilitates the axial positioning of the joint housing 10 relative to the carrier element 34.

In the next method step according to FIG. 20, a forming tool 68 engages into the sheet-metal part 14 and radially expands the circumferential wall portion 18 by plastic deformation such that between the circumferential wall portion 18 and the edge 53 of the assembly opening 52 a non-positive connection is obtained. Since the assembly of the joint housing 10 on the carrier element 34 takes place before the manufacture, i.e. the assembly of the ball joint 12, the tool 68 can easily be introduced into the joint housing 10 and can plastically deform the circumferential wall portion 18 of the sheet-metal part 14 with little effort.

Preferably, the assembly opening 52 of the carrier element 34 also is radially expanded by the forming tool 68. This ensures a continuously gap-free and hence particularly firm and durable non-positive connection between the joint housing 10 and the carrier element 34. As tool 68, at least one sizing stamp usually is employed, which expands the circumferential wall portion 18 of the sheet-metal part 14 exactly to a desired diameter.

As can already be seen in FIG. 19, the edge 53 of the assembly opening 52 is formed such in the illustrated design variant that a diameter of the assembly opening 52 is reduced incrementally in axial direction towards the double-layer portion of the circumferential wall portion 18. The forming tool 68 engaging into the sheet-metal part 14 is adapted to the edge contour of the assembly opening 52 and positively deforms the circumferential wall portion 18 of the sheet-metal part 14 in the region of the assembly opening 52 to the edge contour of the assembly opening 52 (cf. FIG. 20).

After the plastic deformation of the sheet-metal part 14 and preferably also of the carrier element 34 an assembly 70 according to FIG. 20 is obtained, comprising the joint housing 10 as well as the carrier element 34, which includes the assembly opening 52 surrounded by the edge 53, wherein the edge 53 here comprises a holding portion 72. The holding portion 72 surrounds the circumferential wall portion 18 of the sheet-metal part 14 with such a pretension that the joint housing 10 is frictionally held in the holding portion 72.

Although the frictional connection already fixes the joint housing 10 at the carrier element 34 in a reliable and durable way, the sheet-metal part 14 is provided with supporting surfaces 74 which rest against the holding portion 72 in axial direction. In the present case, these supporting surfaces on the one hand are step-like expansions at the first axial end 22 of the circumferential wall portion 18 and on the other hand the radial tab 32, concretely the bearing surface 50 of the U-shaped receptacle 35 of the sheet-metal part 14 at the second axial end 24 of the circumferential wall portion 18. In the third embodiment of the joint housing 10 according to FIG. 17, the step-like expansion at the second axial end 24 of the circumferential wall portion 18 is formed by the double-layer wall portion.

After the assembly of the joint housing 10 on the carrier element 34 is terminated, the assembly of the ball joint 12 now is started. For this purpose, the joint pin 28 is introduced into the axially fixed sheet-metal part 14 and resiliently supported in axial direction.

Subsequently, the bearing shell 42 is pressed into the space between ball head 16 and circumferential wall portion 18 by means of a stamp 78 (cf. FIG. 21).

Thereafter, the housing cover 66 preferably made of sheet metal is applied and rolled in. For rolling in the housing cover 66, a tool 80 is used according to FIG. 22, which axially urges the housing cover 66 against a stop 82 at the sheet-metal part 14 and then plastically deforms the circumferential wall portion 18 at its first axial end 22.

Finally, the sealing bellows 36 is positioned at the housing such that a first axial edge 57 of the sealing bellows 36 extends into the U-shaped receptacle 35, where it is mortised by means of the forming tool 58 only schematically indicated in FIG. 23 by plastic deformation of the U-shaped receptacle 35 (cf. also FIG. 10).

After the assembly of the clamping or locking ring 60 the ball joint 12 according to FIG. 24 is obtained, with the joint housing 10, the joint pin 28 which comprises the ball head 16 accommodated in the joint housing 10 as well as the shank 40, and with the sealing bellows 36 which has the first axial edge 57 attached to the joint housing 10 and a second axial edge 59 attached to the shank 40, wherein the first axial edge 57 of the sealing bellows 36 extends into the U-shaped receptacle 35 integrally molded to the joint housing 10, and wherein the first axial edge 57 is positively and/or frictionally fixed in the U-shaped receptacle 35. The sealing bellows 36 thus can be attached to the joint housing 10 in a particularly simple way without separate mounting elements such as clamping or locking rings.

The method for mounting the joint housing 10 on the carrier element 34 and for manufacturing the ball joint by using a joint housing 10 according to FIG. 18, which is described with reference to FIGS. 19 to 24, can also be applied analogously to the use of a joint housing 10 according to FIG. 17.

Figure 25:
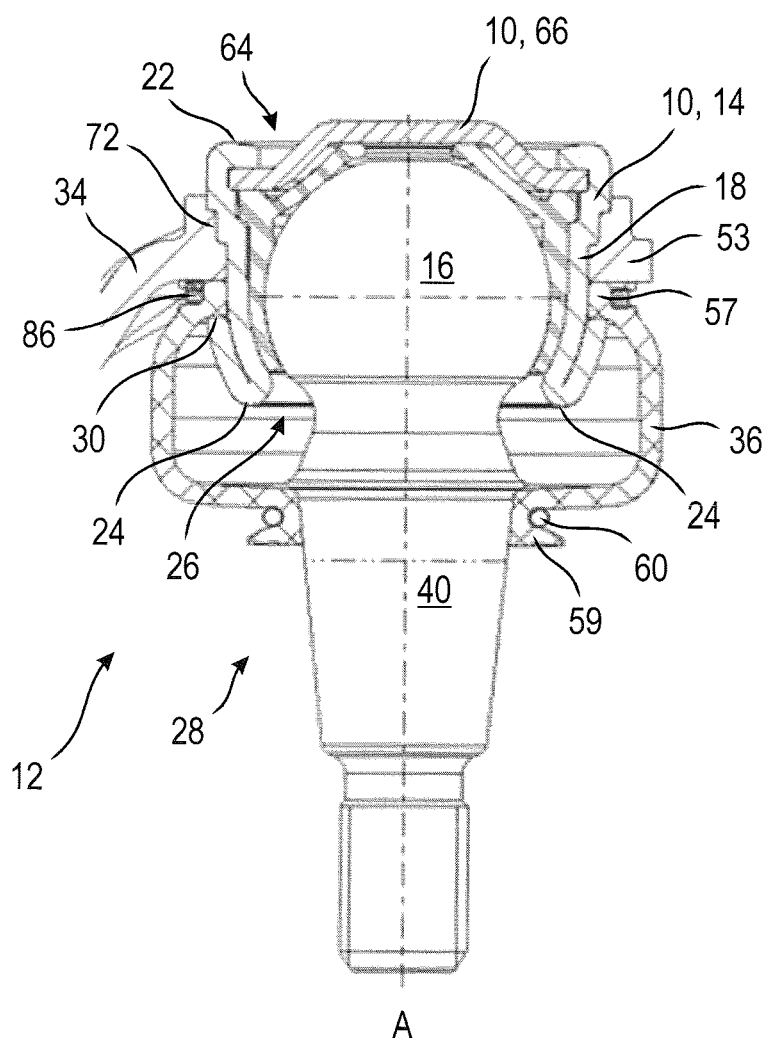
FIG. 25 shows a ball joint of the invention with a joint housing according to FIG. 17.

In this method, a ball joint 12 according to FIG. 25 is obtained, with the joint housing 10, the joint pin 28 which includes a ball head 16 accommodated in the joint housing 10 as well as a shank 40, and with the sealing bellows 36 which has the first axial edge 57 attached to the joint housing 10 and the second axial edge 59 attached to the shank 40, wherein a free edge 30 of the double-layer portion of the sheet-metal part 14 adjoins the sealing bellows 36 and forms an axial stop for the first axial edge 57 thereof.

In FIG. 25, the edge 52 of the assembly opening 52 forms a further axial stop for the first axial edge 57 of the sealing bellows 36, so that after the assembly of a clamping ring 86, which urges the first axial edge 57 radially inwards, the sealing bellows 36 is securely fixed relative to the joint housing 10.

A movement of the joint housing 10 relative to the carrier element 34, which according to FIG. 25 is directed axially upwards, in this case is prevented exclusively by the frictional connection between the circumferential wall portion 18 and the holding portion 72. The first axial edge 57 of the sealing bellows 36 is held merely axially by the two axial stops and experiences no load by joint forces.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for mounting a joint housing on a carrier element with the following steps:
   providing a joint housing of a ball joint that includes: a sheet-metal part for accommodating a ball head, which is substantially rotationally symmetrical with respect to a joint axis and includes a circumferential wall portion, wherein the circumferential wall portion includes a housing opening at an axial end, through which a joint pin can extend, wherein the sheet-metal part is formed with two folded layers at the axial end of the circumferential wall portion;
   providing a carrier element with an assembly opening;
   axially introducing the sheet-metal part of the joint housing into the assembly opening, until the circumferential wall portion thereof adjoins an edge of the assembly opening;
   plastically deforming the sheet-metal part such that it is positively or non-positively fixed at the carrier element.

2. The method according to claim 1, wherein a forming tool engages into the sheet-metal part and radially expands the circumferential wall portion by plastic deformation such that between the circumferential wall portion and the edge of the assembly opening a non-positive connection is obtained.

3. The method according to claim 2, wherein by the forming tool the assembly opening of the carrier element also is radially expanded.

4. The method according to claim 1, wherein the sheet-metal part has a radial tab at a free edge of the two layers, wherein the joint housing is inserted into the assembly opening of the carrier element, until the radial tab supports on the edge of the assembly opening.

5. The method according to any of claim 1, wherein the edge is formed such that a diameter of the assembly opening is reduced in axial direction towards the two layers of the circumferential wall portion, is reduced incrementally, wherein a forming tool adapted to an edge contour of the assembly opening engages into the sheet-metal part and in the region of the assembly opening positively deforms the circumferential wall portion of the sheet-metal part to the edge contour of the assembly opening.

* * * * *